(12) United States Patent
Izumi

(10) Patent No.: US 8,818,598 B2
(45) Date of Patent: Aug. 26, 2014

(54) VEHICLE CONTROL DEVICE AND VEHICLE CONTROL METHOD

(75) Inventor: Junta Izumi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/702,819

(22) PCT Filed: Jul. 5, 2010

(86) PCT No.: PCT/JP2010/061392
§ 371 (c)(1),
(2), (4) Date: Dec. 7, 2012

(87) PCT Pub. No.: WO2012/004846
PCT Pub. Date: Jan. 12, 2012

(65) Prior Publication Data
US 2013/0096760 A1   Apr. 18, 2013

(51) Int. Cl.
*H02J 7/00* (2006.01)
*B60L 9/00* (2006.01)
*B60L 11/00* (2006.01)
*H02J 7/14* (2006.01)
*B60L 11/18* (2006.01)
*B60L 3/00* (2006.01)
*H01M 10/48* (2006.01)
*B60L 11/14* (2006.01)
*B60L 11/12* (2006.01)
*H01M 10/44* (2006.01)

(52) U.S. Cl.
CPC .............. *H02J 7/00* (2013.01); *B60L 11/1872* (2013.01); *B60L 3/0046* (2013.01); *H01M 10/48* (2013.01); *B60L 11/005* (2013.01); *B60L 2210/14* (2013.01); *Y02T 10/7077* (2013.01); *Y02T 10/7005* (2013.01); *Y02T 10/7241* (2013.01); *Y02T 10/6217* (2013.01); *B60L 11/14* (2013.01); *Y02T 10/705* (2013.01); *B60L 2240/547* (2013.01); *Y02T 10/7225* (2013.01); *Y02T 10/7022* (2013.01); *Y02E 60/12* (2013.01); *B60L 2240/545* (2013.01); *B60L 2210/40* (2013.01); *B60L 11/123* (2013.01); *H01M 10/44* (2013.01)
USPC .............................. 701/22; 318/139; 318/151

(58) Field of Classification Search
CPC ........................................................ H02J 7/00
USPC .......................................................... 701/22
See application file for complete search history.

(56) References Cited

U.S. PATENT DOCUMENTS

| 2003/0020434 A1* | 1/2003 | Fukuoka et al. | 320/134 |
| 2003/0169017 A1* | 9/2003 | Ariga et al. | 320/125 |
| 2004/0251870 A1* | 12/2004 | Ueda et al. | 320/104 |

(Continued)

FOREIGN PATENT DOCUMENTS

| JP | A-5-316663 | 11/1993 |
| JP | A-2001-351698 | 12/2001 |

(Continued)

*Primary Examiner* — Fadey Jabr
*Assistant Examiner* — Martin Weeks
(74) *Attorney, Agent, or Firm* — Oliff PLC

(57) ABSTRACT

ECU executes a program including a step of executing first charging control when a charging plug and a charging device are connected, a step of terminating the first charging control when CCV is more than or equal to a threshold value OCV, a step of executing second charging control, and a step of terminating the second charging control when charging is completed.

6 Claims, 6 Drawing Sheets

(56) References Cited

U.S. PATENT DOCUMENTS

2010/0156355 A1* 6/2010 Bauerle et al. ............... 320/145
2011/0227534 A1 9/2011 Mitsutani
2011/0298624 A1* 12/2011 Bauman et al. ............ 340/636.1

FOREIGN PATENT DOCUMENTS

| JP | A-2007-292648 | 11/2007 |
| JP | A-2009-11068 | 1/2009 |
| WO | WO 2010/061465 A1 | 6/2010 |

* cited by examiner

VEHICLE CONTROL DEVICE AND VEHICLE CONTROL METHOD

TECHNICAL FIELD

The present invention relates to controlling a vehicle on which a power storage device and a charging device for charging the power storage device through use of an external power supply are mounted, and more particularly relates to a technique for preventing overcharging of the power storage device.

BACKGROUND ART

In recent years, as one of measures against environmental issues, attention is focusing on a hybrid vehicle, a fuel cell vehicle, an electric vehicle, and the like that run with a driving force from a motor. Such a vehicle may have mounted thereon a power storage device for supplying electric power to the motor and a charging device for charging the power storage device through use of an external power supply.

When charging the power storage device, it is necessary to prevent overcharging so as to avoid degradation of the power storage device from being expedited. In view of such a problem, Japanese Patent Laying-Open No. 05-316663 (PTL 1), for example, discloses a method of charging a storage battery to prevent overcharging when charging a storage battery having been less discharged. This method of charging a storage battery is a method of charging a storage battery in which high rate battery charge is performed until the terminal voltage of the storage battery attains a gas generating voltage, and then trickle charge is performed for a timer time, wherein control is exercised such that a variable per unit time of the terminal voltage of the storage battery is detected during trickle charge, and when this variable is smaller than a full-charge determination value, the timer time is changed to be shorter in accordance with a lapsed time of trickle charge and count-up is continued, and in contrast, when the variable is larger than the full-charge determination value, count-up is continued as it is by the end of the timer time.

The method of charging a storage battery disclosed in the publication mentioned above prevents overcharging when charging a storage battery having been less discharged, which can prevent degradation of the storage battery.

CITATION LIST

Patent Literature

PTL 1: Japanese Patent Laying-Open No. 05-316663

SUMMARY OF INVENTION

Technical Problem

When charging a power storage device mounted on a vehicle at an upper limit value of charging electric power through use of an external power supply, the power storage device may be charged with charging electric power smaller than charging electric power having been estimated since charging electric power varies due to various factors. Completion of charging of the power storage device is determined based on a measured voltage of the power storage device. However, the threshold value of a measured voltage corresponding to a predetermined remaining capacity varies due to variations in charging electric power. Therefore, in the case where charging electric power is smaller than charging electric power having been estimated as mentioned above, the power storage device may be charged in excess of a target amount of charge when charging is terminated at the time when the measured voltage exceeds the threshold value.

An object of the present invention is to provide a vehicle control device and a vehicle control method for preventing overcharging during charging through use of an external power supply.

Solution to Problem

A vehicle control device according to an aspect of the present invention is a vehicle control device mounted on a vehicle including a rotating electric machine serving as a drive source, a power storage device for supplying electric power to the rotating electric machine, and a charging device for charging the power storage device through use of an external power supply. This vehicle control device includes a detection unit for detecting a real voltage of the power storage device, and a control unit for executing first charging control for charging the power storage device at an upper limit value of charging electric power through use of the external power supply when the external power supply and the charging device are connected. The control unit compares the real voltage detected by the detection unit during execution of the first charging control and a first threshold value which is an open circuit voltage of the power storage device when a charged state of the power storage device is a target charged state, and terminates the first charging control when the real voltage is more than or equal to the first threshold value.

Preferably, the control unit executes the first charging control while setting the upper limit value of the charging electric power at a smaller one of an upper limit value of charging electric power based on the state of the charging device and an upper limit value of charging electric power that can be received in the power storage device.

More preferably, the target charged state is a fully charged state of the power storage device.

Still more preferably, when the upper limit value of the charging electric power is restricted to be smaller than a standard value based on the state of the charging device and the state of the power storage device, the control unit terminates the first charging control when the real voltage detected by the detection unit during execution of the first charging control is more than or equal to the first threshold value.

Still more preferably, the control unit executes second charging control for charging the power storage device setting charging electric power to be constant after the first charging control is terminated, and terminates the second charging control when the real voltage detected by the detection unit during execution of the second charging control is more than or equal to a second threshold value. The second threshold value is a real voltage during execution of the second charging control corresponding to a case where the charged state of the power storage device is a fully charged state, and is a value larger than the first threshold value.

Still more preferably, the control unit terminates the second charging control when the charging electric power is smaller than or equal to a predetermined value.

A vehicle control method according to another aspect of the present invention is a vehicle control method for a vehicle including a rotating electric machine serving as a drive source, a power storage device for supplying electric power to the rotating electric machine, and a charging device for charging the power storage device through use of an external power supply. This vehicle control method includes the steps of detecting a real voltage of the power storage device, executing first charging control for charging the power storage device at an upper limit value of charging electric power through use of the external power supply when the external power supply and the charging device are connected, and comparing the real voltage detected by the step of detecting the real voltage during execution of the first charging control and a first threshold value which is an open circuit voltage of the power storage device when a charged state of the power storage device (42) is a target charged state, and terminating the first charging control when the real voltage is more than or equal to the first threshold value.

Advantageous Effects of Invention

According to the present invention, charging in excess of a target amount of charge can be prevented reliably even if variations occur in charging electric power during charging through use of an external power supply. Accordingly, the charged state of a main battery can be reliably avoided from attaining an overcharged state. Therefore, a vehicle control device and a vehicle control method for preventing overcharging during charging through use of an external power supply can be provided.

DESCRIPTION OF EMBODIMENTS

Figure 1:
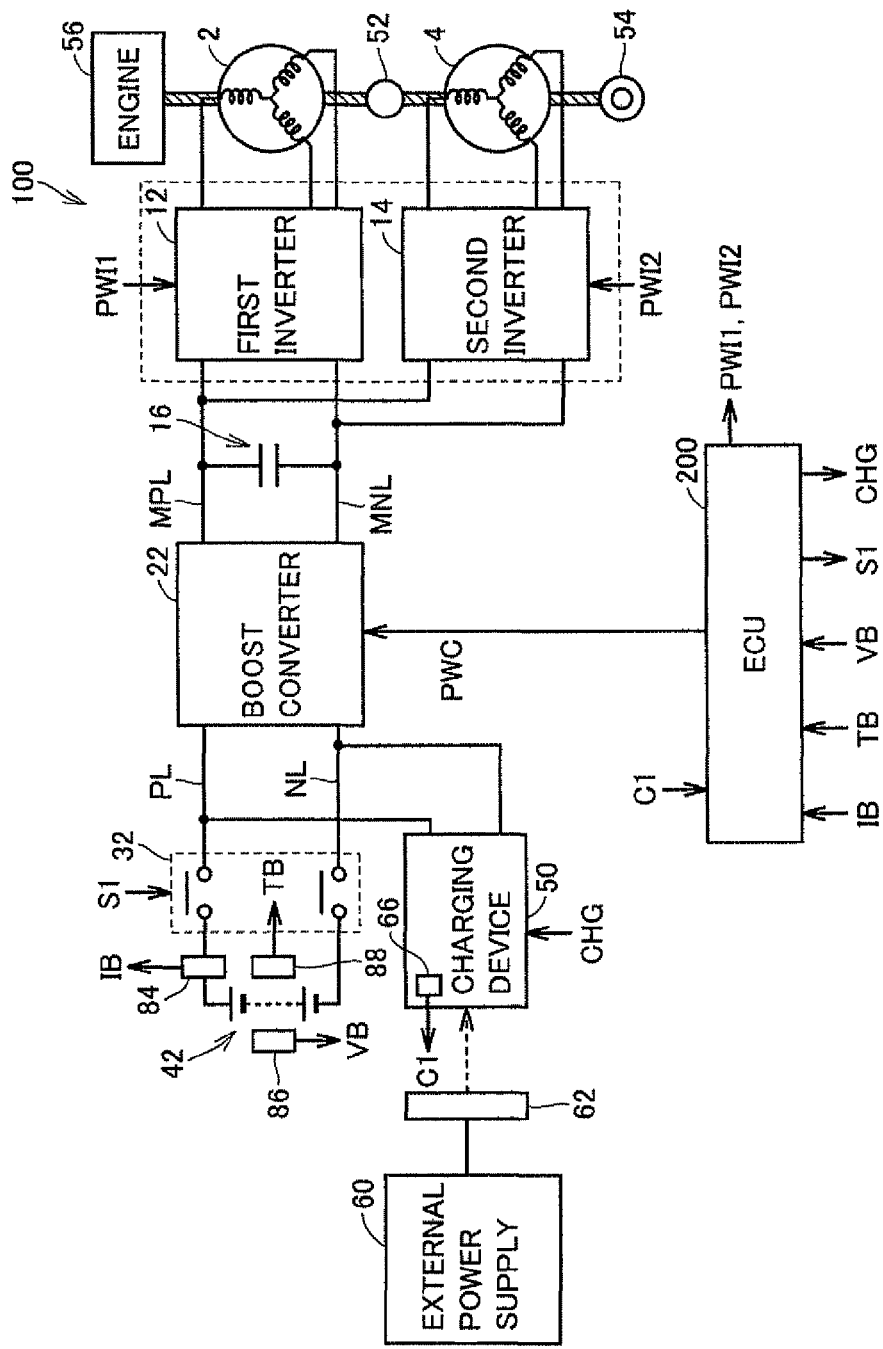
FIG. 1 is an overall block diagram of a hybrid vehicle on which a vehicle control device according to the present embodiment is mounted.

Hereinafter, an embodiment of the present invention will be described with reference to the drawings. In the following description, the same parts have the same reference characters allotted. They also have the same names and functions. Therefore, detailed description thereof will not be repeated.

As shown in FIG. 1, a vehicle 100 includes a first motor-generator (hereinafter referred to as MG) 2, a second MG4, a first inverter 12, a second inverter 14, a smoothing capacitor 16, a boost converter 22, a system main relay (hereinafter referred to as SMR) 32, a main battery 42, a charging device 50, a power split device 52, a driving wheel 54, an engine 56, and an ECU (Electronic Control Unit) 200.

In the present embodiment, although vehicle 100 will be described as a hybrid vehicle, it is not particularly limited to a hybrid vehicle, but only needs to be a vehicle at least using a rotating electric machine as a drive source. Therefore, vehicle 100 may be an electric vehicle.

First MG2, second MG4 and engine 56 are coupled to power split device 52. This vehicle 100 runs with a driving force from a drive source of at least one of engine 56 and second MG4. Motive power generated by engine 56 is split into two paths by power split device 52. One is a path for transmission to driving wheel 54, and the other is a path for transmission to first MG2.

Each of first MG2 and second MG4 is an AC rotating electric machine, and is a three-phase AC rotating electric machine equipped with a rotor in which a permanent magnet is buried, for example. First MG2 generates electric power using part of the motive power of engine 56 split by power split device 52. For example, when SOC (State of Charge) indicating the remaining capacity of main battery 42 falls below a predetermined value, engine 56 starts and first MG2 generates electric power, and the generated electric power is supplied to main battery 42.

Second MG4 produces a driving force using electric power supplied from second inverter 14. The driving force of second MG4 is transmitted to driving wheel 54. It is noted that, during braking of vehicle 100, second MG4 is driven by driving wheel 54, and second MG4 operates as a power generator. In this manner, second MG4 operates as a regenerative brake that converts braking energy into electric power. Electric power generated by second MG4 is supplied to the second inverter. The electric power supplied to the second inverter is supplied to main battery 42 via boost converter 22.

Power split device 52 is a planetary gear including a sun gear, a pinion gear, a carrier, and a ring gear (neither shown). The pinion gear is engaged with the sun gear and the ring gear. The carrier rotatably supports the pinion gear, and is coupled to a crankshaft of engine 56. The sun gear is coupled to a rotation shaft of first MG2. The ring gear is coupled to a rotation shaft of second MG4.

First inverter 12 and second inverter 14 are connected in parallel to each other and are each connected to a main positive bus MPL and a main negative bus MNL. First inverter 12 converts DC power supplied from boost converter 22 into AC power for output to first MG2. Second inverter 14 converts a DC current supplied from boost converter 22 into AC power for output to second MG4.

Furthermore, first inverter 12 converts AC power generated in first MG2 into DC power for output to boost converter 22. Second inverter 14 converts AC power generated in second MG4 into DC power for output to boost converter 22.

It is noted that each of first inverter 12 and second inverter 14 is implemented by a bridge circuit including switching elements of three phases, for example. First inverter 12 drives first MG2 by performing a switching operation in accordance with a control signal PWI1 from ECU 200. Second inverter 14 drives second MG4 by performing a switching operation in accordance with a control signal PWI2 from ECU 200.

ECU 200 calculates vehicle request power Ps based on a detection signal of each sensor not shown (e.g., a signal indicating the degree by which a brake pedal, an accelerator pedal or the like is pressed), traveling conditions, and the like, and based on calculated vehicle request power Ps, calculates torque target values and speed target values for first MG2 and second MG4. ECU 200 controls first inverter 12 and second inverter 14 such that generated torques and speeds of first MG2 and second MG4 attain target values.

On the other hand, main battery 42 is a rechargeable DC power source, and is implemented by, for example, a secondary battery, such as a nickel-metal hydride battery or a lithium ion battery, a large-capacitance capacitor, or the like. Main battery 42 is connected to boost converter 22 with SMR 32 interposed therebetween.

It is noted that, although the present embodiment will describe a case where main battery 42 is mounted on vehicle 100 as a main power supply, it is not particularly limited to such a structure, but another sub-battery or two or more sub-batteries may be mounted in addition to main battery 42.

Based on a control signal S1 from ECU 200, SMR 32 performs switching from one of a conduction state in which main battery 42 and boost converter 22 are electrically connected and a disconnection state in which main battery 42 and boost converter 22 are electrically disconnected, to the other state.

Boost converter 22 is connected to main positive bus MPL and main negative bus MNL. Boost converter 22 performs voltage conversion between main battery 42 and main positive bus MPL and main negative bus MNL, based on control signal PWC1 from ECU 200.

Smoothing capacitor 16 is connected across main positive bus MPL and main negative bus MNL, and reduces power fluctuation components included in main positive bus MPL and main negative bus MNL.

A current sensor 84, a voltage sensor 86 and a temperature sensor 88 are further connected to ECU 200.

Current sensor 84 detects a current IB flowing from main battery 42 to boost converter 22, and transmits a signal indicating detected current IB to ECU 200. Voltage sensor 86 detects a voltage VB of main battery 42, and transmits a signal indicating detected voltage VB to ECU 200. Temperature sensor 88 detects a temperature TB of main battery 42, and transmits a signal indicating detected temperature TB to ECU 200.

ECU 200 calculates SOC of main battery 42 based on current IB detected by current sensor 84 and voltage VB detected by voltage sensor 86. It is noted that ECU 200 may calculate SOC of main battery 42 based on temperature TB of main battery 42 in addition to current IB and voltage VB.

Moreover, ECU 200 calculates SOC of main battery 42 based on OCV (Open Circuit Voltage).

It is noted that, although the present embodiment has described that current sensor 84 shall detect the current through the positive electrode line, it is not particularly limited to this, but may detect the current through the negative electrode line, for example.

ECU 200 generates control signal PWC1 for controlling boost converter 22 based on vehicle request power Ps. ECU 200 transmits generated control signal PWC1 to boost converter 22 to control boost converter 22.

An external power supply 60 is a power supply provided outside vehicle 100, and may be an AC power supply, such as a commercial power supply, for example. External power supply 60 is connected to a charging plug 62 via a charging cable. Charging plug 62 has a shape that can be connected to charging device 50.

After charging plug 62 is connected thereto, charging device 50 charges main battery 42 using electric power of external power supply 60 in accordance with a control signal CHG from ECU 200.

Charging device 50 includes a connection check sensor 66 for detecting that charging plug 62 and charging device 50 have been connected. For example, connection check sensor 66 is an electrical circuit brought into conduction by connection between charging plug 62 and charging device 50. Connection check sensor 66 transmits a signal C1 indicating that charging plug 62 and charging device 50 have been connected to ECU 200.

In such vehicle 100, ECU 200 successively executes first charging control and second charging control when charging plug 62 is connected to charging device 50, thereby charging main battery 42 such that SOC thereof reaches a fully charged state. The fully charged state is a state in which SOC reaches an upper limit value. The upper limit value is not limited to SOC 100%, but may be a value smaller than 100%.

Figure 2:
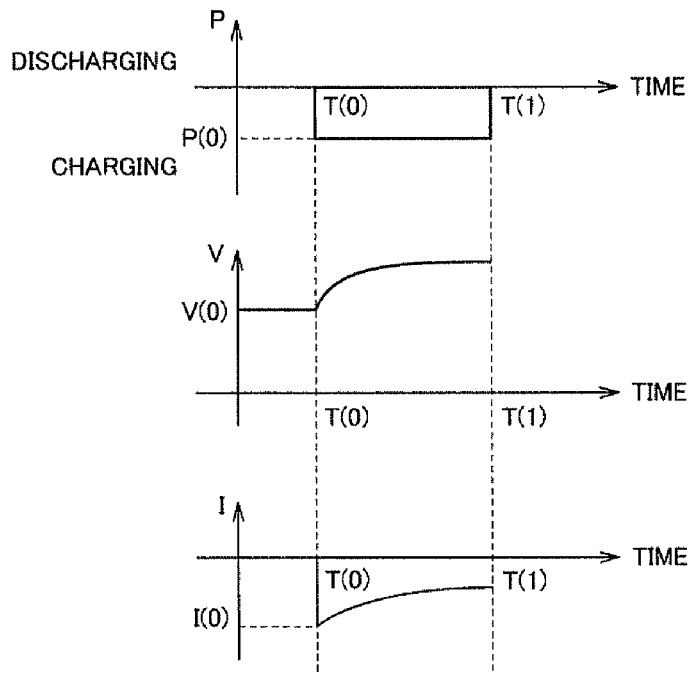
FIG. 2 is a timing chart showing changes in voltage and current when charging electric power is set constant during charging through use of an external power supply.

As shown in FIG. 2, ECU 200 charges main battery 42 such that charging electric power is constant during execution of each of the first charging control and the second charging control. For example, at time T(0), main battery 42 is charged such that charging electric power is constant at P(0) when the first charging control is executed when charging plug 62 is connected to charging device 50.

At this time, a voltage V and a current I change such that the product of voltage V and current I is charging electric power P(0). After charging is started at time T(0) where the initial voltage is a voltage V(0), voltage V increases so as to be higher than voltage V(0) with the lapse of time. After charging is started at time T(0) where the initial current is a current I(0), current I increases so as to be higher than current 40) with the lapse of time. It is noted that, in FIG. 2, main battery 42 will be charged when charging electric power P and current I have negative values.

The first charging control is charging control of executing charging at the upper limit value of charging electric power P. ECU 200 sets the upper limit value of charging electric power P at a smaller one of the upper limit value of output of charging device 50 and the upper limit value of charging electric power that can be received by main battery 42.

For example, when a commercial power supply is used as external power supply 60 and when an electric instrument is used in parallel to charging of main battery 42 through use of external power supply 60, the upper limit value of output of charging device 50 is smaller than the upper limit value of output of charging device 50 when no electric instrument is used. In this way, the upper limit value of output of charging device 50 varies depending on the use/disuse of an electric instrument.

The output of charging device 50 is charging electric power lower than the set charging electric power immediately after the start of operation of charging device 50, and changes with the lapse of time so as to converge on the set charging electric power. In this way, the upper limit value of output of charging device 50 varies until it converges on the set charging electric power from the initial stage of operation.

Furthermore, a saving mode of charging device 50 is executed when charging device 50 is overheated or main battery 42 is overheated. Therefore, charging device 50 will output charging electric power lower than the set charging electric power to main battery 42. Charging device 50 may return to the set charging electric power when the overheated state of charging device 50 or main battery 42 is solved. In this way, the upper limit value of output of charging device 50 also varies depending on whether or not the saving mode is executed.

The upper limit value of charging electric power that can be received by main battery 42 varies in accordance with present SOC and temperature TB of main battery 42.

Charging electric power P may thus vary when charging main battery 42 at the upper limit value of charging electric power P through use of external power supply 60. Therefore, main battery 42 may be charged with charging electric power lower than estimated charging electric power during execution of the first charging control. Termination of the first charging control is determined based on voltage VB (hereinafter referred to as CCV) measured by voltage sensor 86 during execution of the first charging control.

However, since the threshold value of CCV corresponding to a target SOC for terminating the first charging control varies with variations in charging electric power, main battery 42 may be charged in excess of target SOC when charging is completed at the time when CCV exceeds the threshold value in the case where charging electric power is smaller than the estimated charging electric power.

Figure 3:
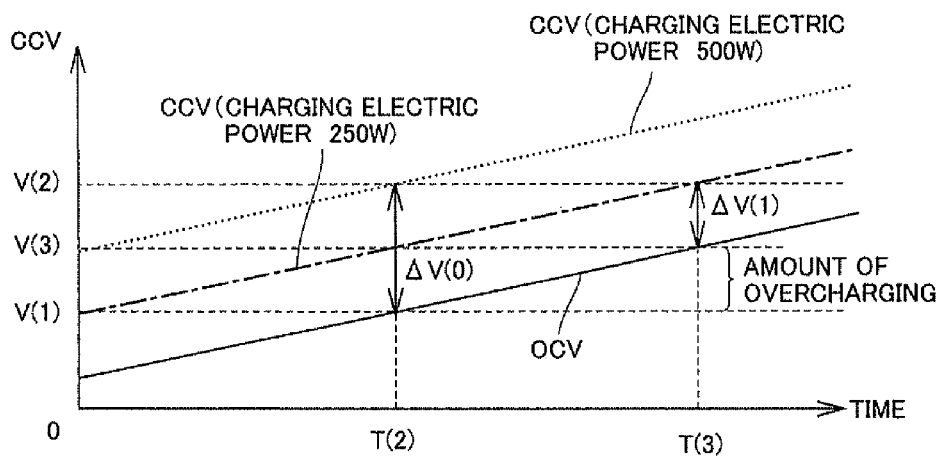
FIG. 3 is a timing chart showing changes in CCV and OCV during charging through use of the external power supply.

As shown in FIG. 3, assume a case of charging when charging electric power P=500 W, for example. The vertical axis of FIG. 3 indicates CCV. The horizontal axis of FIG. 3 indicates time. An open circuit voltage (hereinafter referred to as OCV) of main battery 42 corresponding to target SOC is assumed to be a voltage V(1). The threshold value of CCV corresponding to target SOC when charging electric power P is 500 W is assumed to be a voltage V(2). It is noted that voltage V(2) is a value obtained by adding $\Delta V(0)$ to voltage V(1). Herein, $\Delta V(0)$ represents the amount of changes in voltage based on the internal resistance and polarization.

After the start of charging through use of external power supply 60, ECU 200 terminates charging control assuming that SOC of main battery 42 has reached target SOC when CCV is more than or equal, to voltage V(2) at time T(2), as indicated by the broken line of FIG. 3.

However, as described above, in the case where charging electric power P varies to be 250 W, for example, CCV changes as indicated by the alternate long and short dash line of FIG. 3. Therefore, after the start of charging through use of external power supply 60, ECU 200 terminates charging control assuming that SOC of main battery 42 has reached target SOC when CCV is more than or equal to voltage V(2) at time T(3). In the case where charging electric power P is 250 W, the amount of changes in voltage is $\Delta V(1)$ which is smaller than $\Delta V(0)$. Thus, OCV has reached voltage V(3) which is higher than voltage V(1) at the time when CCV exceeds voltage V(2), so that charging will be performed in excess of target SOC.

Therefore, in the present embodiment, ECU 200 is characterized by comparing a real voltage detected by voltage sensor 86 during execution of the first charging control and a threshold value OCV(0) which is an open circuit voltage of main battery 42 in the case where the charged state of main battery 42 is a target charged state, and terminating the first charging control in the case where the real voltage is more than or equal to a first threshold value. In the present embodiment, the target charged state is a fully charged state of main battery 42.

ECU 200 also executes the second charging control for charging main battery 42 by setting charging electric power to become constant after the first charging control is completed. ECU 200 terminates the second charging control when the real voltage detected by voltage sensor 86 during execution of the second charging control is more than or equal to a threshold value CCV(0). Threshold value CCV(0) is a real voltage during execution of the second charging control corresponding to the case where the charged state of main battery 42 is the fully charged state, and is a value larger than threshold value OCV(0).

Figure 4:
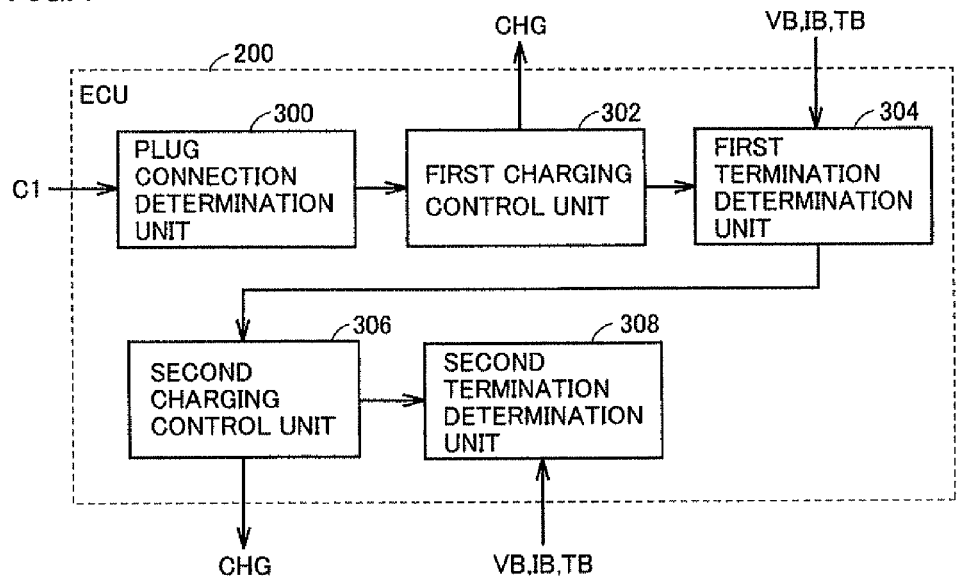
FIG. 4 is a functional block diagram of ECU as a vehicle control device according to the present embodiment.

FIG. 4 shows a functional block diagram of ECU 200 as a vehicle control device according to the present embodiment. ECU 200 includes a plug connection determination unit 300, a first charging control unit 302, a first termination determination unit 304, a second charging control unit 306, and a second termination determination unit 308.

Plug connection determination unit 300 determines whether or not charging plug 62 and charging device 50 have been connected. Specifically, plug connection determination unit 300 determines that charging plug 62 and charging device 50 have been connected when signal C1 is received from connection check sensor 66. It is noted that plug connection determination unit 300 may turn on a plug connection determination flag when determined that charging plug 62 and charging device 50 have been connected, for example.

First charging control unit 302 executes the first charging control when it is determined that charging plug 62 and charging device 50 have been connected. It is noted that, in addition to the case where it is determined that charging plug 62 and charging device 50 have been connected, first charging control unit 302 may execute the first charging control, for example, when a manipulation signal transmitted to ECU 200 by a user operation on an operating member (e.g., a button, a lever, etc.) for starting charging is received. First charging control unit 302 may also, execute the first charging control, for example, when the plug connection determination flag is changed from off to on.

The first charging control is control of charging main battery 42 at the upper limit value of charging electric power P through use of external power supply 60, as described above. First charging control unit 302 executes the first charging control while setting the upper limit value of charging electric power at a smaller one of the upper limit value of charging electric power P based on the state of charging device 50 and the upper limit value of charging electric power P that can be received in main battery 42. The state of charging device 50 refers to a state where, when a commercial power supply is used as external power supply 60, the output of charging device 50 is restricted depending on the presence/absence of an electric instrument used in parallel to charging, the presence/absence of drop in output at the initial stage of charging or execution of saving mode at the time of overheating, or the like.

Figure 5:
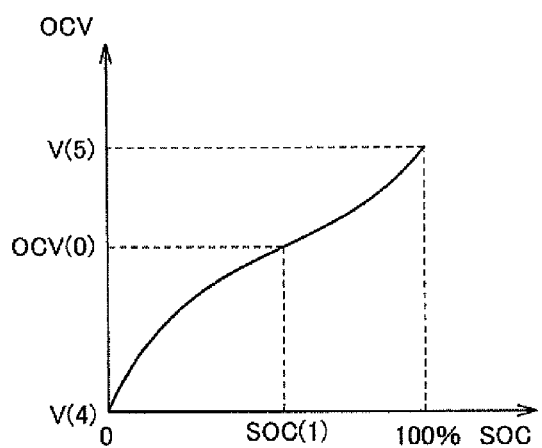
FIG. 5 is a diagram showing the relationship between OCV and SOC.

First termination determination unit 304 determines whether or not the first charging control is terminated. Specifically, first termination determination unit 304 terminates the first charging control when it is determined that voltage VB (i.e., CCV) detected by voltage sensor 86 during execution of the first charging control is more than or equal to threshold value OCV(0). Threshold value OCV(0) is target SOC in the case of charging main battery 42 by the first charging control. OCV(0) corresponding to target SOC is derived from the relationship between OCV and SOC as shown in FIG. 5, for example. The vertical axis of FIG. 5 indicates OCV, and the horizontal axis of FIG. 5 indicates SOC. In FIG. 5, it is shown that SOC corresponds to 0% when OCV is a voltage V(4), and SOC corresponds to 100% when OCV is a voltage V(5). For example, when target SOC is SOC(1), threshold value OCV(0) of OCV corresponding to target SOC is derived from the relationship shown in FIG. 5. It is noted that the relationship between OCV and SOC is not particularly limited to the relationship shown in FIG. 5, but differs depending on the type of battery, or the like. Therefore, OCV and SOC may have a proportional relationship, for example. Target SOC may be SOC corresponding to the fully charged state, or may be SOC lower than SOC corresponding to the fully charged state, for example.

First termination determination unit 304 may terminate the first charging control and also turn on a first charging control termination flag when CCV is more than or equal to threshold value OCV(0), for example. Alternatively, in the case where the upper limit value of charging electric power is restricted to be smaller than a standard value based on the state of charging device 50 and the state of main battery 42, first termination determination unit 304 may compare CCV and OCV(0) and terminate the first charging control when CCV is more than or equal to OCV(0). It is noted that the standard value of the upper limit value of charging electric power refers to the upper limit value of output of charging device 50 in the case where charging electric power that can be received in main battery 42 is larger than the upper limit value of output of charging device 50 and in the case where there is no factor that restricts the upper limit value of output of charging device 50, such as when another electric instrument is operating, the saving mode is being performed, or the operating period of charging device 50 is a period until the charging electric power converges on set charging electric power from the initial stage of operation.

Second charging control unit 306 executes the second charging control after the first charging control is terminated. It is noted that second charging control unit 306 may execute the second charging control when the first charging control termination flag is changed from off to on, for example.

The second charging control is control of charging main battery 42 setting charging electric power P at constant value P(0) through use of external power supply 60, as described above. Although the present embodiment describes charging electric power P(0) as 500 W, for example, it is not particularly limited to this. Moreover, although the present embodiment has described the second charging control as control of charging main battery 42 setting the charging electric power at constant value P(0), it is not particularly limited to such charging control. For example, the second charging control may be control of charging main battery 42 setting the voltage at a constant value.

Second termination determination unit 308 terminates the second charging control when CCV is more than or equal to threshold value CCV(0) of CCV corresponding to the fully charged state during execution of the second charging control.

Threshold value CCV(0) is a threshold value of CCV in the case where charging electric power P is P(0) and SOC of main battery 42 is in the fully charged state. Threshold value CCV (0) is a value obtained by adding $\Delta V$ when charging electric power P is P(0) to OCV(1) corresponding to the fully charged state. Moreover, $\Delta V$ represents the amount of changes in voltage including an internal resistance component and a polarization component as described above, and is a value depending on temperature TB.

Figure 6:
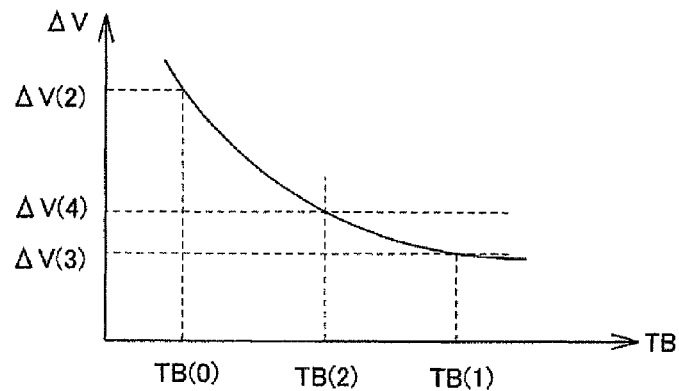
FIG. 6 is a diagram showing the relationship between ΔV and temperature TB.

Second termination determination unit 308 calculates $\Delta V$ corresponding to temperature TB from a map indicating the relationship between temperature TB and $\Delta V$ shown in FIG. 6, for example. The vertical axis of FIG. 6 indicates $\Delta V$, and the horizontal axis of FIG. 6 indicates temperature TB. As shown in FIG. 6, the relationship between temperature TB and $\Delta V$ is such that $\Delta V(2)$ corresponding to a temperature TB(0) is larger than $\Delta V(3)$ corresponding to a temperature TB(1) which is higher than temperature TB(0).

When temperature TB of main battery 42 detected by temperature sensor 88 is TB(2), for example, second termination determination unit 308 calculates $\Delta V(4)$ from the map shown in FIG. 6, and adds $\Delta V(4)$ to OCV(1) corresponding to the fully charged state to calculate CCV(0).

It is noted that second termination determination unit 308 may terminate the second charging control and turn off the first charging control termination flag when CCV is more than or equal to threshold value CCV(0) during execution of the second charging control, for example.

Alternatively, second termination determination unit 308 may terminate the second charging control when charging electric power estimated cannot be ensured during execution of the second charging control (e.g., when charging electric power P is smaller than or equal to a predetermined value lower than 500 W).

Although the present embodiment describes plug connection determination unit 300, first charging control unit 302, first termination determination unit 304, second charging control unit 306, and second termination determination unit 308 as each functioning as software embodied by CPU of ECU 200 executing a program stored in a memory, but may be embodied by hardware. It is noted that such a program is recorded on a storage medium and is mounted on the vehicle.

Figure 7:
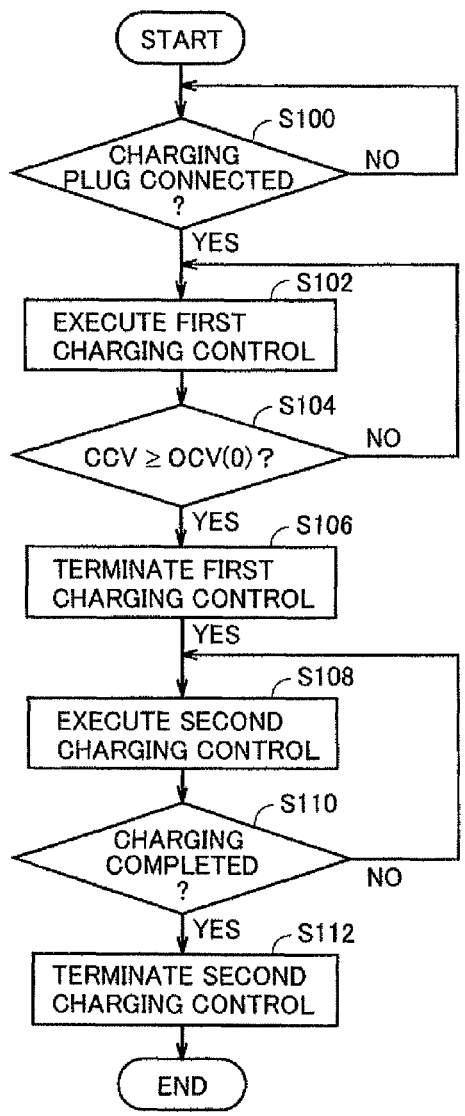
FIG. 7 is a flowchart showing a control structure of a program executed by ECU as the vehicle control device according to the present embodiment.

Referring to FIG. 7, the control structure of a program executed by ECU 200 as the vehicle control device according to the present embodiment will be described.

In Step (hereinafter, step will be indicated by S) 100, ECU 200 determines whether or not charging plug 62 and charging device 50 have been connected. When charging plug 62 and charging device 50 have been connected (YES in S100), the process proceeds to S102. Otherwise (NO in S100), the process is returned to S100.

In S102, ECU 200 executes the first charging control. Since the first charging control is as described above, detailed description thereof will not be repeated.

In S104, ECU 200 determines whether or not CCV is more than or equal to threshold value OCV(0). When CCV is more than or equal to threshold value OCV(0) (YES in S104), the process proceeds to S106. Otherwise (NO in S104), the process is returned to S102.

In S106, ECU 200 terminates the first charging control. In S108, ECU 200 executes the second charging control. Since the second charging control is as described above, detailed description thereof will not be repeated.

In S110, ECU 200 determines whether or not charging has been completed. ECU 200 determines that charging has been completed when CCV is more than or equal to threshold value CCV(0). When it is determined that charging has been completed (YES in S110), the process proceeds to S112. Otherwise (NO in S110), the process is returned to S108. In S112, ECU 200 terminates the second charging control.

The operation of ECU 200 as the vehicle control device according to the present embodiment based on the structure and flowchart as described above will be described using FIG. 8.

Figure 8:
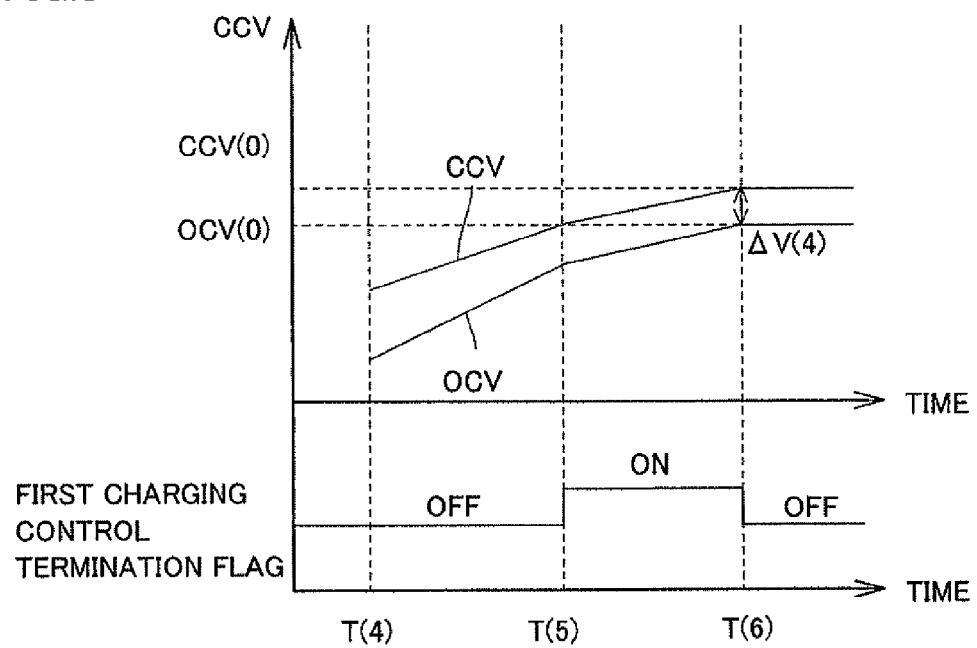
FIG. 8 is a timing chart for explaining an operation of ECU as the vehicle control device according to the present embodiment.

For example, when charging plug 62 and charging device 50 are connected by a user attaching charging plug 62 to vehicle 100 (YES in S100), the first charging control is executed (S102) at time T(4), as shown in FIG. 8.

During the first charging control, main battery 42 is charged using, as charging electric power P, a smaller one of the upper limit value of output of charging device 50 and the upper limit value of electric power that can be received in main battery 42. When the first charging control is executed, CCV and OCV both increase with the lapse of time.

Since the equation OCV=CCV−$\Delta V$ holds and $\Delta V$ depends on temperature TB, $\Delta V$ drops as shown in as FIG. 6 when temperature TB of main battery 42 is raised by generated heat during charging. Accordingly, the difference between CCV and OCV (=$\Delta V$) decreases by the temperature rise of main battery 42 with the lapse of time.

When CCV is more than or equal to OCV(0) at time T(5) during execution of the first charging control (YES in S104), the first charging control is terminated (S106). The first charging control termination flag is turned on along with termination of the first charging control. Then, the second charging control is executed (S108). By execution of the second charging control, main battery 42 is charged using constant value P(0) (e.g., 500 W) as the charging electric power. Since the charging electric power in the second charging control is smaller than the charging electric power in the first charging control, the amount of time changes in CCV after the start of the second charging control is smaller than the amount of time changes in CCV during execution of the first charging control, and the amount of time changes in OCV after the start of the second charging control is also smaller than the amount of time changes in OCV during execution of the first charging control.

When CCV is more than or equal to threshold value CCV (0) at time T(6) (YES in S110), the second charging control is terminated (S112). The first charging control termination flag is turned off along with termination of the second charging control. At the time of termination of the second charging control, SOC of main battery 42 attains the fully charged state.

As described above, with the vehicle control device according to the present embodiment, by comparing CCV and OCV(0) of OCV corresponding to target SOC during execution of the first charging control, and terminating the first charging control when CCV is more than or equal to OCV(0), SOC of the main battery can be reliably prevented from exceeding target SOC even if variations in charging electric power occur during charging through use of an external power supply. Accordingly, the charged state of the main battery can be reliably avoided from attaining the overcharged state in such a case where target SOC is the fully charged state. Therefore, a vehicle control device and a vehicle control method for preventing overcharging during charging through use of an external power supply can be provided.

Moreover, by executing the second charging control such that constant charging electric power is attained after termination of the first charging control, and terminating the second charging control when CCV is more than or equal to threshold value CCV(0) of CCV, SOC of the main battery can be brought into the fully charged state with high accuracy.

Figure 9:
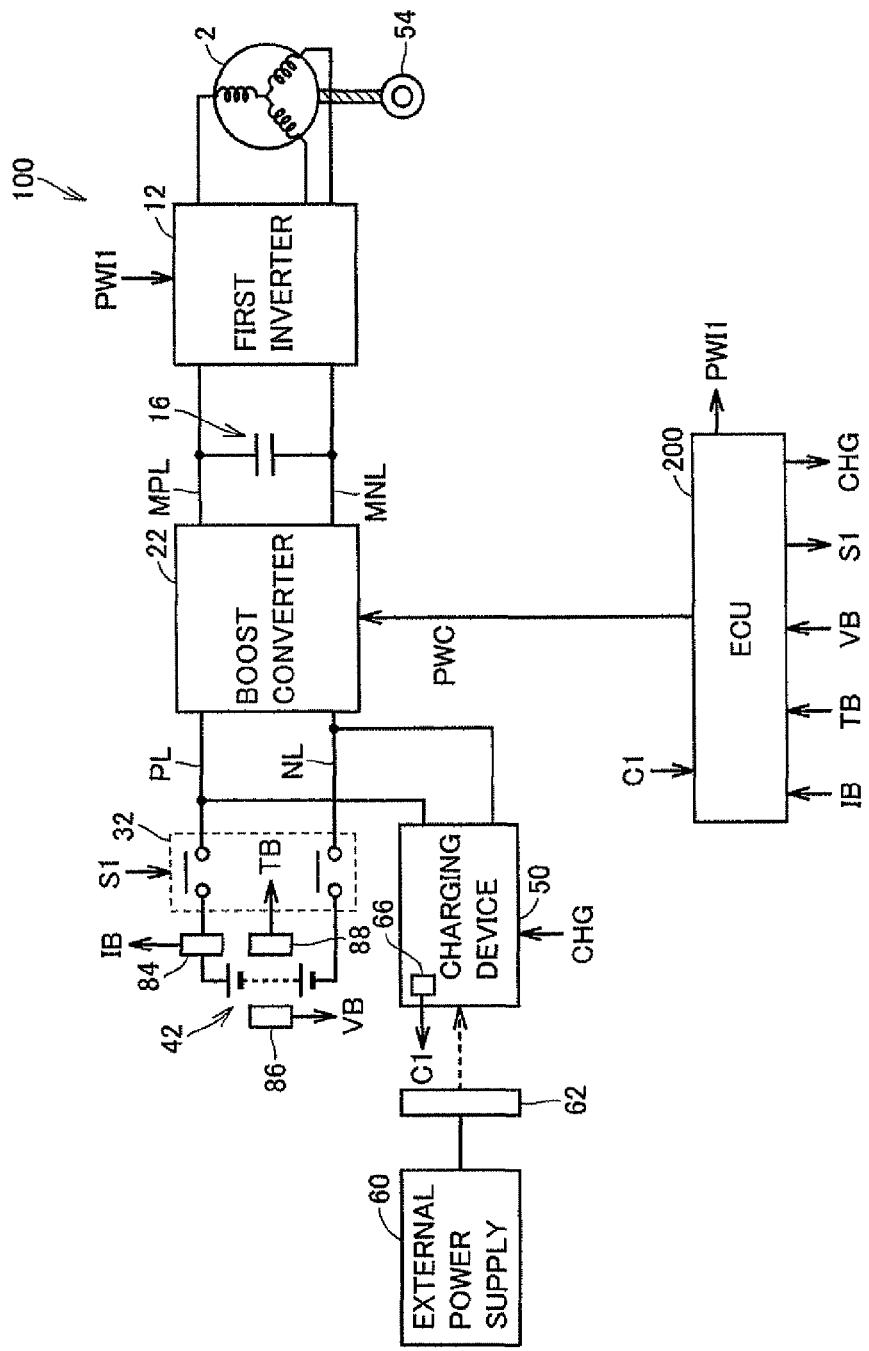
FIG. 9 is an overall block diagram of an electric vehicle to which the present invention is applicable.

Furthermore, the structure of vehicle 100 is not particularly limited to the structure shown in FIG. 1, but may be the structure of an electric vehicle shown in FIG. 9, for example.

As compared with the structure of vehicle 100 shown in FIG. 1, vehicle 100 shown in FIG. 9 differs in that first MG2 is a rotating electric machine for running that drives driving wheel 54, and that second MG4, second inverter 14, power split device 52, and engine 56 are not provided. Since the remaining structure is similar to the structure of vehicle 100 shown in FIG. 1, detailed description of which is not repeated.

It should be understood that the embodiment disclosed herein is illustrative and non-restrictive in every respect. The scope of the present invention is defined by the claims not by the description above, and is intended to include any modification within the meaning and scope equivalent to the terms of the claims.

REFERENCE SIGNS LIST

2, 4 MG; 12, 14 inverter, 16 smoothing capacitor; 22 boost converter; 32 SMR; 42 main battery; 50 charging device; 52 power split device; 54 driving wheel; 56 engine; 60 external power supply; 62 charging plug; 66 connection check sensor; 84 current sensor; 86 voltage sensor; 88 temperature sensor; 100 vehicle; 200 ECU; 300 plug connection determination unit; 302 first charging control unit; 304 first termination determination unit; 306 second charging control unit; 308 second termination determination unit

The invention claimed is:

1. A vehicle control device mounted on a vehicle including a rotating electric machine serving as a drive source, a power storage device for supplying electric power to said rotating electric machine, and a charging device for charging said power storage device through use of an external power supply, comprising:

an electronic detection unit configured to detect a real voltage of said power storage device; and an electronic control unit configured to execute a first charging control for charging said power storage device at an upper limit value of charging electric power through use of said external power supply when said external power supply and said charging device are connected, said control unit comparing said real voltage detected by said detection unit during execution of said first charging control and a first threshold value which is an open circuit voltage of said power storage device when a charged state of said power storage device is a target charged state, and terminating said first charging control when said real voltage is more than or equal to said first threshold value, said control unit executing second charging control for charging said power storage device setting charging electric power to be constant after said first charging control is terminated, and terminating said second charging control when said real voltage detected by said detection unit during execution of said second charging control is more than or equal to a second threshold value, said second threshold value being a real voltage during execution of said second charging control corresponding to a case where the charged state of said power storage device is a fully charged state, and being a value larger than said first threshold value.

2. The vehicle control device according to claim 1, wherein said control unit executes said first charging control while setting the upper limit value of said charging electric power at a smaller one of an upper limit value of charging electric power based on the state of said charging device and an upper limit value of charging electric power that can be received in said power storage device.

3. The vehicle control device according to claim 1, wherein said target charged state is a fully charged state of said power storage device.

4. The vehicle control device according to claim 1, wherein, when the upper limit value of said charging electric power is restricted to be smaller than a standard value based on the state of said charging device and the state of said power storage device, said control unit terminates said first charging control when said real voltage detected by said detection unit during execution of said first charging control is more than or equal to said first threshold value.

5. The vehicle control device according to claim 1, wherein said control unit terminates said second charging control when said charging electric power is smaller than or equal to a predetermined value.

6. A vehicle control method for a vehicle including a rotating electric machine serving as a drive source, a power storage device for supplying electric power to said rotating electric machine, and a charging device for charging said power storage device through use of an external power supply, comprising the steps of:

detecting a real voltage of said power storage device;

executing first charging control by an electronic control unit for charging said power storage device at an upper limit value of charging electric power through use of said external power supply when said external power supply and said charging device are connected;

comparing said real voltage detected by said step of detecting said real voltage during execution of said first charging control and a first threshold value which is an open circuit voltage of said power storage device when a charged state of said power storage device is a target charged state, and terminating said first charging control when said real voltage is more than or equal to said first threshold value; and executing second charging control by an electronic control unit for charging said power storage device setting charging electric power to be constant after said first charging control is terminated, and terminating said second charging control when said real voltage detected by said step of detecting the real voltage during execution of said second charging control is more than or equal to a second threshold value, said second threshold value being a real voltage during execution of said second charging control corresponding to a case where the charged state of said power storage device is a fully charged state, and being a value larger than said first threshold value.

\* \* \* \* \*